US007381378B2

(12) United States Patent
McWhorter

(10) Patent No.: US 7,381,378 B2
(45) Date of Patent: Jun. 3, 2008

(54) COAL FLUE GAS SCRUBBER

(76) Inventor: Edward Milton McWhorter, 6931 Greenbrook Cir., Citrus Heights, CA (US) 95621

(*) Notice: Subject to any disclaimer, the term of this patent is extended or adjusted under 35 U.S.C. 154(b) by 405 days.

(21) Appl. No.: 11/075,218

(22) Filed: Mar. 9, 2005

(65) Prior Publication Data
US 2006/0204407 A1    Sep. 14, 2006

(51) Int. Cl.
| | |
|---|---|
| B01D 50/00 | (2006.01) |
| B01D 53/34 | (2006.01) |
| B01D 47/00 | (2006.01) |
| B01D 53/14 | (2006.01) |
| F01N 3/00 | (2006.01) |
| F23J 11/00 | (2006.01) |

(52) U.S. Cl. ............... 422/168; 422/177; 422/178; 96/301; 96/311; 96/313
(58) Field of Classification Search ............ 422/168; 96/301, 311, 313
See application file for complete search history.

(56) References Cited

U.S. PATENT DOCUMENTS 4,113,840 A * 9/1978 Hanway et al. ........ 423/244.03
4,962,279 A * 10/1990 Anderson et al. ........... 501/150
5,759,233 A * 6/1998 Schwab ........................ 95/8
6,488,740 B1 * 12/2002 Patel et al. .................. 95/71

FOREIGN PATENT DOCUMENTS

EP       1201290 A1 *  5/2002
JP     09299744 A  * 11/1997

OTHER PUBLICATIONS

JPO Machine Translation of JP 09-299744 A.*

* cited by examiner

*Primary Examiner*—Alexa D. Neckel
*Assistant Examiner*—Matthew J Merkling

(57) ABSTRACT

The invention is a flue gas scrubber for removing carbon dioxide from the emissions of coal fired furnaces by induced draft of said emissions into a scrubber barrel which is positioned within the facility smoke stack. The flue gases pass through electrically charged plates and enter said scrubber barrel tangentially through a connecting duct and pass upward and through a sorbent mist containing a dissolved salt that is generated as the diffused horizontal discharge from a plurality of longitudinally aligned ejectors. The sorbent liquid from the said ejectors containing the captured effluent carbon dioxide passes upward and coalesces on the cooling surfaces of a condenser positioned in a sonic resonant field and then passes downward into a sludge basin where it is further processed to remove particulate mater and to reclaim the scrubber water.

1 Claim, 1 Drawing Sheet

COAL FLUE GAS SCRUBBER

CROSS REFERENCES

In the current invention, references to aqueous alkaline solutions relates to spent electrolyte substances that are produced by hydrolysis of alkali metals and alkali earth metals as specified in U.S. Pat. No. 6,653,007, A Hydrogen Generator For Fuel Cell Operation, and copending applications; A Consumable Electrode Ser. No. 10/392,608 filed Mar. 21, 2003 and Fuel Cell Electrode, Ser. No. 10/607,245 filed Jun. 27, 2003 and Alkaline Electrode Tape, Ser. No. 10/877,201 filed Jun. 17, 2004.

BACKGROUND OF THE INVENTION

The invention is a facility for removing carbon dioxide ($CO_2$) from the flue gases of coal fired furnaces by absorption in a water spray or dilute aqueous alkaline spray. The use of basic alkaline solutions for the absorption of carbon dioxide has been well established from the earliest chemical studies and has been in use for many years, as in the instance of the Orsat laboratory test apparatus. However, the sequestering of larger quantities of carbon dioxide on a commercial scale from a coal burning furnace by such methods would be financially impractical. This impracticability can be readily appreciated by considering the magnitude of gaseous products produced in the combustion of coal.

If one assumes a completely saturated bituminous chain (hydrogen saturation) comprising methylene intermediate structure and complete combustion to carbon dioxide and water it can be shown that the proportion by weight of carbon reaction product ($CO_2$), relative to reactant carbon ($CH_2$) is about 3 to 1. In other words, the combustion of one ton of coal will produce 3 tons of carbon dioxide. To react 3 tons of carbon dioxide with sodium hydroxide (NaOH) would be financially impractical in considering the general formula, $C_mH_n+(m+n/4)O_2 \rightarrow mCO_2+n/2H_2O$, where m is the number of carbon atoms present in the coal, and n is the number of hydrogen atoms. The reactant product would be sodium carbonate ($Na_2CO_3$) and as indicated this material imbalance would be further exacerbated by the fact that it would require two sodium atoms to neutralize each carbon atom, and thus prohibitive in cost. The amount of alkaline material available in today's market product flow would not be sufficient in quantity to carry out the neutralization of carbon dioxide in coal fired furnace emissions. The problem is only partly alleviated by the use of calcium hydroxide (CaOH) which reacts on a one for one basis with carbon dioxide to produce calcium carbonate ($CaCO_3$). The primary novelty of this invention is the proposed use of spent electrolyte from electrolytic fuel cells that will be available in sufficient quantities to carry out these reactions. The spent electrolyte is obtained as a by-product of the fuel cell operation discussed in the above Cross References.

It is estimated that the Electrolytic Transportation fuel systems described in the above Cross References will produce about 5 gallons of NaOH solution from the combined initiator reactions (hydrolysis of Na) and calcium moderator reactions (hydrolysis of Ca) from one pound of the alloyed metals (NaCa). This material will be collected at vehicle service stations in tank car quantities to be shipped to coal burning electrical generating facilities for emission control. Noteworthy of this process for the removal of carbon dioxide from coal flue gas is the fact that the sequestered material produced is a saleable value-added commodity which will support the cost of the scrubbing treatment and material recovery operation.

Because of the huge volume of flue gas to be treated as compared with the smaller liquid volume of alkaline spent electrolyte available from the electrolytic fuels program, a unique method of efficiently bringing the two reactants into intimate contact is by use of a liquid to gas ejector system. This effectively improves the material surface contact and mixing characteristics between the two systems which react chemically as a function of the area of the reacting interface and turbulent agitation during the absorption.

Ejectors are used extensively in power generating facilities and have found wide application in the chemical industry. Ejectors may be operated with liquids, gases, or vapors. In the present invention air and water, and in other instances air and spent electrolyte are used as ejector nozzle driving fluids in the formation of absorbent spray in the sequestering process. The momentum exchange energies of these fluid masses passing through the nozzle are used to effect carbon dioxide entrainment by impact with intervening flue gases at the inlet of an axially opposed diffuser section. The resultant force of this impact carries the reacting fluids through the diffuser where they exit as a diffused mixture in a misting zone. At the diffuser exit the gaseous components expand and the liquid components form micron size droplets that have a high surface to volume ratio which increase the absorption rate of carbon dioxide. The small droplets diffuse rapidly in the turbulent system and sequester carbon dioxide in the upward draft of flue gases in the scrubber barrel. At the upper end of the scrubber barrel the diffused droplets are cooled and coalesce into condensed liquid form and pass downward on both sides of the scrubber barrel carrying the sequestered carbon dioxide into the sludge basin where it is pumped to the reclamation facility for further processing into saleable value added substances.

Compared with other gases carbon dioxide is quite soluble in water. The aqueous solutions created in these reactions are acid with a pH of about 4, which are generally considered as being carbonic acid $H_2CO_3$ formed by the reaction of the $CO_2$ with the water $H_2O$, although this reaction is only theoretical. However it is generally assumed a small amount of carbon dioxide does react to produce the said carbonic acid $H_2CO_3$ and it can be assumed to dissociate to form protons and bicarbonate ion ($H_2CO_3 \Leftrightarrow H^+ + HCO_3^-$) which permit the charged reactants to be held in place by electrical charges that are placed on the ejectors and on charge plates immediately adjacent to the induced draft fan.

During an interim period, when electrolytic material is not available, the scrubber can be operated on water alone to produce the said carbonic reaction in the removal of carbon dioxide from flue gases.

SUMMARY OF THE INVENTION

The invention is a flue gas scrubber operating at the outlet duct to the stack of a coal gas furnace.

In one configuration the system employs an alkaline solution comprised of fuel cell electrolyte ejector spray for reaction with carbon dioxide to form sodium carbonate $Na_2CO_3$.

In another configuration the invention is used to sequester carbon dioxide from flue gas by absorption in a water spray as carbonic acid.

It is yet another object of the invention to sequester carbon dioxide from a flue gas by absorption into an electrically charged water spray, said electrical charge increasing the strength of ionic affiliation and thus maintain a stronger equilibrium and longer duration in the resonant formation of carbonic acid.

And still another object of the invention is to provide the processing equipment for reclamation and handling of water sequestered carbon dioxide gases and sodium and carbonate precipitate sludge solids as value-added material for resale.

BRIEF DESCRIPTION OF THE DRAWINGS

Drawings of the invention are presented as part of the specification.

DETAILED DESCRIPTION OF THE INVENTION

Figure 1:
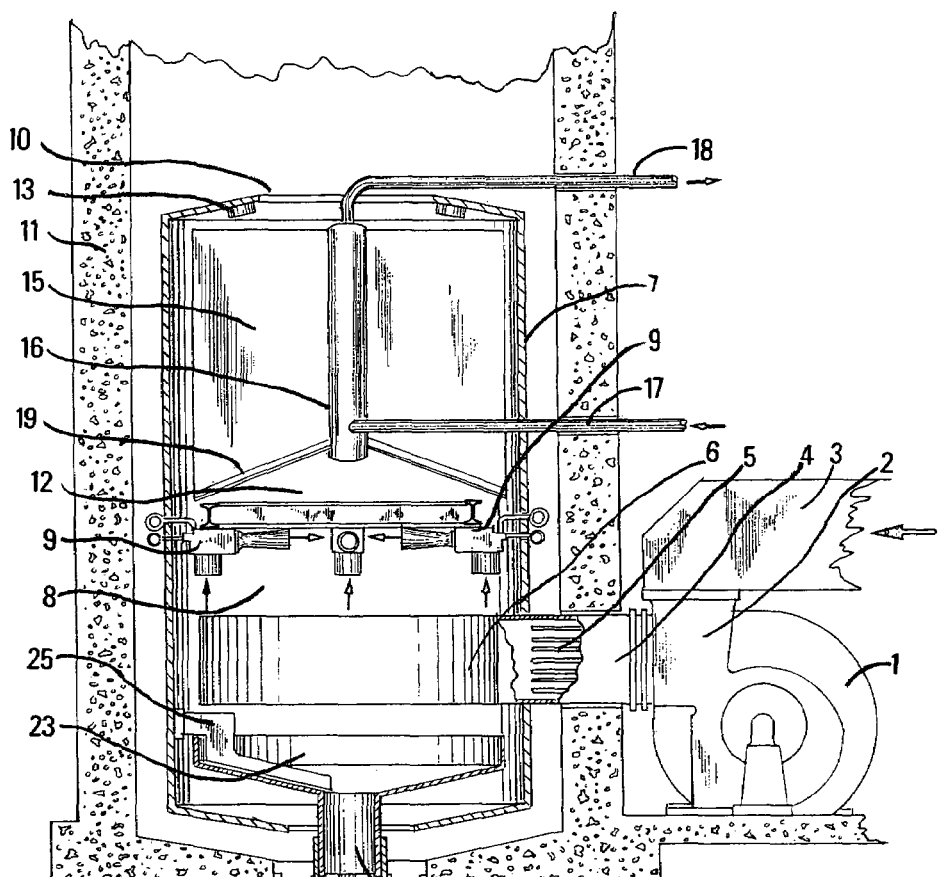
FIG. 1 Is a coal flue gas scrubber assembly shown principally in cross-section.

The invention shown in FIG. 1 is a liquid sequestering facility for the removal of carbon dioxide from combustion emissions of coal fired furnaces. The said facility uses water, or dilute aqueous alkaline solutions as a sequestering agent in the absorption process.

The scrubber system of FIG. 1 operates in the following manner. Coal flue gas enters exhaust fan 1 inlet 2 from furnace exhaust duct 3 and is induced by said exhaust fan 1 into connecting duct 4 holding electrically charged plates 5. The flue gases pass through the said connecting duct 4 into receiver 6 axially centered in scrubber barrel 7. Receiver 6 is a short height cylinder of large diameter in which the top is open and its volume in communication with the misting zone 8 volume in said scrubbing barrel 7.

The said connecting duct 4 is eccentrically attached to receiver 6 such that the ducted flue gas enters receiver 6 tangentially and thus generates a swirling motion within receiver 6 in the same manner as that induced in the manifolds of cyclone separators. The said swirling flue gases pass out of the open top of said receiver 6 into scrubber barrel 7 and pass into said misting zone 8 in which water or aqueous alkaline solutions are diffused as a mist by a plurality of ejectors 9 that are shown arranged in a single horizontal plane within scrubber barrel 7 above receiver 6.

The induced horizontal spiralling motion of the flue gas particles in receiver 6 increases the horizontal component of the vectored upward flow out of scrubber barrel 7 through scrubber barrel opening 10 into facility smoke stack 11. The said increased horizontal component of directed flow increases the mean free path of flue gas particulate matter and gaseous flow pattern. Since the residence time of particulate matter induced into the barrel remains unchanged by increases in particulate horizontal path it can only be assumed that particulate velocity is increased along the said spiral path into the misting zone 8. The increased particle horizontal velocity exponentially increases the force of impact of the carbon dioxide with the alkaline spray in passing through the said misting zone 8. The increased force of impact increases the energy of absorption and sequestering of the carbon dioxide.

Immediately above ejector 9 misting zone 8 is the sonic coalescing zone 12. Entrained water vapor passing above ejectors 9 from misting zone 8 enter the sonic coalescing zone 12 where it is subjected to high frequency sonic agitation by sonic transducers 13 attached to scrubber barrel 7 near barrel opening 10. Sonic agitation increases the random contact between vapor particles causing them to condense and fall toward the bottom of scrubber barrel 7.

Located immediately above the ejector system, within the coalescing zone, is the condenser plate assembly hereinafter referred to as condenser 14. Condenser 14 is comprised of a plurality of internally cooled surfaces 15 that are radially attached to a central water distributing column 16. Water enters column 16 through conduit 17 and circulates through plate surfaces 15 and exits condenser 14 at the top of distributing water column 16 through conduit 18. The top edge of cooling surfaces 15 are at right angles with the sides, but the lower edge of cooling surfaces 15 are trapezoidal being slanted downward towards the sides of scrubber barrel 7. Troughs 19 are fixedly attached at each bottom edge of cooling surfaces 15 and direct condensed water vapor holding sequestered material toward the sides of scrubber barrel 7 where it drains downward and passes out of scrubber barrel 7 through drain passage 20 into sludge basin 21. Submersible motor 22 turns rotating table 23 by drive shaft 24. Stationary scraper blade 25 fixedly attached to scrubber barrel 7 removes precipitated material from the rotating table 23 directing it through drain passage 20 leading into sludge basin 21. Submersible sludge basin pump 26 empties sludge basin 21 through conduit 27 that leads to the sludge reclamation facility and carbon dioxide compressor plant.

Figure 2:
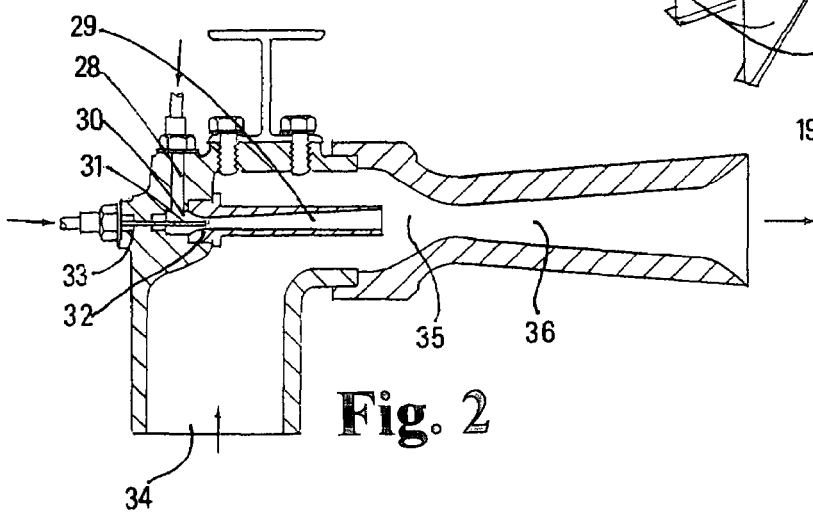
FIG. 2 Is a liquid to gas ejector shown in cross-section.

Turning now to FIG. 2 which shows the interior details of ejector 9. Three fluid streams merge within ejector 9 and emerge from the diffusing nozzle as a fine mist into the misting zone 8.

Compressed air entering ejector 9 at inlet port 28 pressurizes nozzle 29 chamber 30 and aspirates water or dilute aqueous alkaline solutions from injector tube 31 at throat 32 of said nozzle 29. Said water or dilute aqueous alkaline solutions entering ejector 9 injection tube 31 through inlet port 33. Flue gas enters ejector 9 through port 34 and fills the inlet volume 35 of the ejector 9 diffuser 36. High velocity flow of compressed air and aspirated aqueous solution exit nozzle 29 and impact the flue gas in the inlet volume 35. The impact of high velocity flow from nozzle 29 with flue gases in volume 35 carry the flue gas and aqueous solution through ejector 9 diffuser 36 where they are discharged from ejector 9 as an atomized spray in misting zone 8 and sequester carbon dioxide passing upward in scrubber barrel 7 from receiver 6.

Swirling flue gases rising upward from receiver 6 pass through misting zone 8 where carbon dioxide is sequestered in the aqueous droplets of the diffused spray from ejectors 9 and are condensed in the coalescing zone 12 and drain downward into the sludge basin 21.

Figure 3:
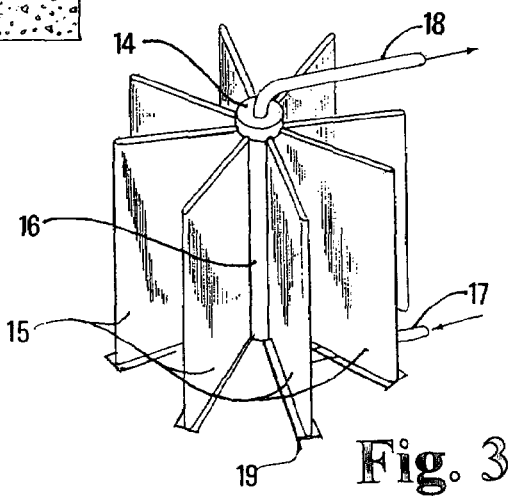
FIG. 3 Is a perspective view of a condenser comprising a plurality of radially attached cooling surface plates.

FIG. 3 is a perspective view of condenser 14 showing radial arrangement of a plurality of cooling surfaces 15 about water column 16. Warm moist air retains its water content and vaporized atmospheric water is responsible to some degree of localized atmospheric warming but does not have the same retention duration as carbon dioxide. Lowering the temperature of the stack gases will decrease the amount of combustion water retained and will lower the incidence and potential of acid rain.

What is claimed is:

1. A coal flue gas scrubber for removing carbon dioxide from flue gases of coal fired furnaces, said scrubber comprising a cylindrical vessel hereinafter termed a scrubber barrel, said scrubber barrel positioned within a coal fired furnace smoke stack, said scrubber barrel having a small opening at the top for gaseous flow into said smoke stack, a bottom opening hereinafter called a drain passage for sorbent liquid to drain into a sludge basin, a facility exhaust fan forcing combustion flue gases into a connecting duct, said conducting duct holding electrically charged plates for placing a charge on said combustion flue gases, said connecting duct eccentrically attached to the side of a receiver, said receiver axially concentrically positioned within said scrubber barrel, said eccentric attachment of said conducting duct to said receiver causes the flow of said charged combustion flue gas to move tangentially in a horizontal spiraling upward flow into a misting zone of said scrubber barrel, said misting zone containing finely diffused sorbent spray discharged from a plurality of ejectors, said ejector finely diffused sorbent spray being horizontally directed in the same direction of said horizontal spiraling flow of said receiver, said combustion gases from said receiver and finely diffused sorbent spray, into a coalescing zone, condenser in said coalescing zone, said condenser having a plurality of water cooled plates and ultrasonic transducers mounted on said scrubber barrel, said finely diffused sorbent spray being condensed on said wafer cooled plates, said finely diffused sorbent spray coalescing on said coolant plates and passing downward to channels at the bottom of said water cooled plates and directed to the sides of said scrubber barrel bottom opening, a rotating table below said bottom opening, a scraper blade removing precipitate material from said rotating table, said sorbent spray and said precipitate material falling through said bottom opening into a sludge basin, a submersible sludge pump pumping sorbent and sludge out of said sludge basin.

* * * * *